March 25, 1930.   H. A. MYERS   1,751,491
MUSICAL TOY
Filed Jan. 30, 1929
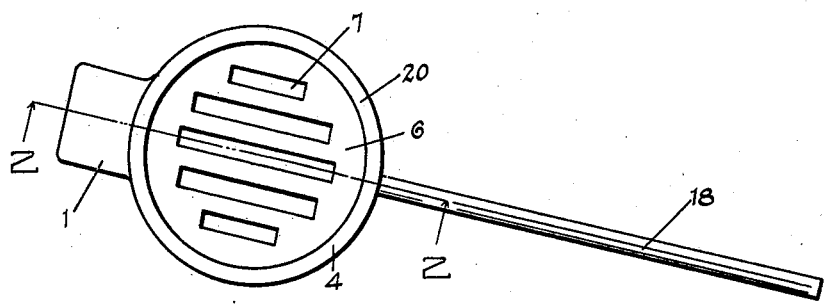
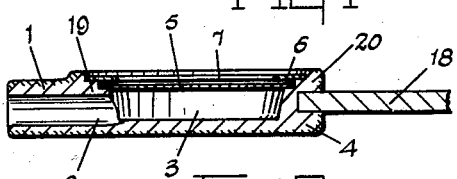
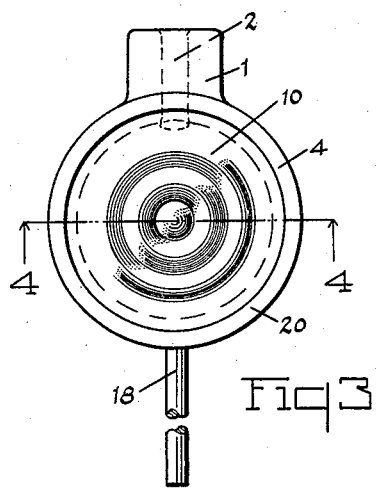
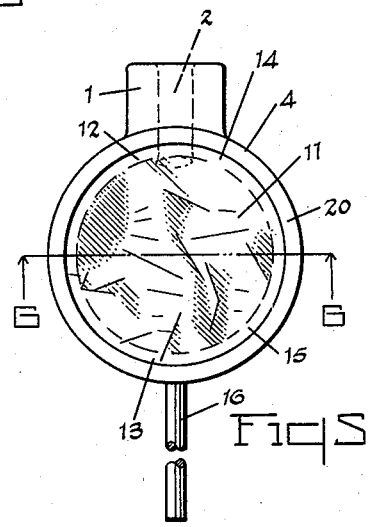
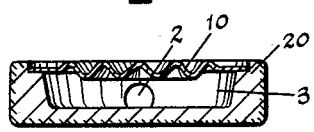
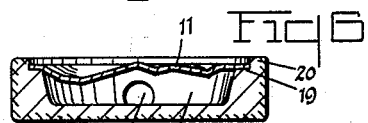
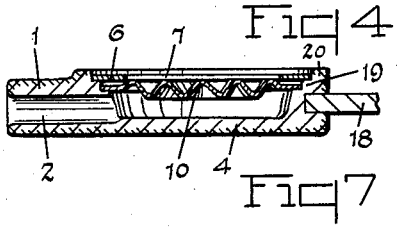
Inventor
Hubert A. Myers.
By Faust F. Crampton.
Attorney Patented Mar. 25, 1930

1,751,491

UNITED STATES PATENT OFFICE

HUBERT A. MYERS, OF TOLEDO, OHIO

MUSICAL TOY

Application filed January 30, 1929. Serial No. 336,032.

My invention has for its object to form a musical toy from a confection material that is so shaped as to appeal to children and, being formed of a confection, is edible and consequently additionally attractive. The invention, moreover, appeals to children because of the sounds that may be formed thereby. Consequently, the invention embodies all of the essentials that are particularly desirable to children. The invention particularly provides a construction whereby the sounds produced by the voice are modulated or affected to produce clearer notes than that is commonly produced by the "kazoo" toys and also whereby sounds of low or slight intensity may be readily modulated or affected to produce clear tones. Thus, the invention insures responsiveness of the instrument to all vocal sounds that may be produced by the child and produces a clear note as distinct from a buzzing sound.

The invention may be contained in structures of different forms and, to illustrate a practical application of the invention, I have selected a form of construction and modifications thereof as an example of constructions that contain the invention. The construction selected is shown in the accompanying drawings and is described hereinafter.

Fig. 1 illustrates a top view of a "pop" form of musical candy toy. Fig. 2 illustrates a view of a section taken on the plane of the line 2—2 indicated in Fig. 1. Fig. 3 illustrates a modified form of the structure shown in Fig. 1. Fig. 4 is a view of a section taken on the plane of the line 4—4 indicated in Fig. 3. Fig. 5 is a further modification of the structure shown in Fig. 1. Fig. 6 is a view of a section taken on the plane of the line 6—6 indicated in Fig. 5. Fig. 7 illustrates a variation in the combinations of diaphragms that may be used in the construction.

In the form of construction shown in Figs. 1 and 2, and in modifications of the construction shown in the other figures, the body of the instrument is made substantially in the form of a lollipop, the "pop" being formed dish shaped and the material being, preferably, a moldable material, such as hard candy of the type from which lollipops are commonly formed. It is provided with a mouth piece 1 that has a passage-way 2 that communicates with a chamber 3 formed in the body of the "pop" 4 by means of a diaphragm 5 that is stretched tightly over the edge or to parts of the edge of the "pop". The diaphragm is formed of a thin paper, preferably well calendered, and stretched in all directions so as to present a smooth and even surface when properly placed on the edge of the "pop". Good effects, however, are obtained if portions only of the diaphragm are stretched across the edges of the "pop". In order to produce the desired responsiveness of the "pop" to variations of sound producible by a child, it is necessary that portions of the paper shall be quite taut across the chamber 3 of the "pop".

Preferably, the diaphragm 5 is covered by a protective diaphragm 6 which is formed of a more rigid material, such as a well calendered cardboard and, preferably, one having openings such as the slots 7 formed therein. The parts between the openings, or the slots 7, form vibrating units which are caused to vibrate by contacting areas of the inner diaphragm to produce pleasant modulations of the sound. The inner diaphragm 5 is stretched tightly and smoothly across the edge of the "pop" and the diaphragm 6 is so located as to be spaced from the diaphragm 5 and in parallel relation thereto at a point of about $\frac{1}{32}$ of an inch. The breath coming from the mouth of the user operates to slightly distend the diaphragm 5 and bring it into contact with the diaphragm 6 over a small area and with a slight pressure sufficient to produce variations in pressure against the diaphragm 6, and to change the contact area between the two diaphragms in accordance to the vibrations induced in the inner diaphragm and also to cause the inner diaphragm to move to and from or against and away from the outer diaphragm. Hence, there is a transmission of the vibrations that are more readily induced in the light weight inner diaphragm to the outer diaphragm which modifies the sound produced by causing the production of lower notes.

In the form of construction shown in Figs.

3 and 4, a diaphragm 10 is used which is formed of thin, relatively stiff paper, which may be pressed to form corrugations. It is secured to the edge of the "pop" and is slightly stretched between two or more oppositely disposed points on the edge of the "pop". The corrugations operate to maintain the elasticity of the diaphragm and give it a greater play or distention and retractiveness. The diaphragm 10 causes the toy to be responsive to all variations of sound that may be produced.

In the form of construction shown in Figs. 5 and 6, the diaphragm 11 is secured to the edge of the "pop" 4 but is drawn taut along only one or two lines extending across the chamber 3. The tautness is maintained as between points located on opposite portions of the edge of the body of the "pop" 4, such as at the points 12 and 13 and the points 14 and 15. Where a protective diaphragm is used, portions of the diaphragm 11 will be brought into contact with the protective diaphragm, such as where the diaphragm 6 is used in connection with the form of construction shown in Figs. 5 and 6, and varying areas of the portions of the diaphragm 11 between the points 12 and 13 or between the points 14 and 15, will make contact with such a protective diaphragm for modulation of the sound waves produced by the voice of the user. As shown in the form of construction illustrated in Fig. 7, the corrugated diaphragm 10 is located in parallel arrangement with the diaphragm 7 of the form shown in Fig. 1. Portions of the corrugations are in contact with the diaphragm and these areas are varied as the voice vibrations set up in the diaphragm 10 vary. Modulation of the voice waves are thus produced in the same manner as in the form of construction shown in Figs. 1 and 2.

The musical "pops" are supported on sticks, such as the sticks 18. The diaphragms are secured by the inherent stickiness of candy when warmed or when moist and, subsequently, hardened by a lowering of the temperature or removing the moisture. Preferably, the edge of each pop is stepped, as at 19, to form a rim 20 surrounding the edge of the outer diaphragm and to space the diaphragms apart the desired distances where more than one is used.

I claim:

1. In a toy, a body having a recess, a diaphragm of elastic sheet material located over the recess and having a part drawn relatively tight across the recess and a part relatively loosely mounted for freer vibration, the diaphragm forming a closed chamber within the body of the toy, a mouth piece having a passage-way communicating with the interior of the said chamber.

2. In a toy, a body having a recess, a diaphragm of elastic sheet material located over the said recess, part of the diaphragm drawn relatively tight across the recess and a part relatively loosely mounted for freer vibration, the diaphragm forming a closed chamber within the body of the toy, a second diaphragm having openings therein and located in close parallel relation to the first named diaphragm to form variable contact areas of the diaphragms, one against the other, by vocal sound waves, a mouth piece connected to the toy, the mouth piece having a passage-way communicating with the chamber.

3. In a toy, a body having a recess, a diaphragm of elastic sheet material located over the said recess, parts of the diaphragm drawn relatively tight across the recess and a part relatively loosely mounted for freer vibration, the diaphragm forming a closed chamber within the body of the toy, a second diaphragm having openings therein and located in close parallel relation to the first named diaphragm, portions of the diaphragms located in contact with each other and operating to form variable contact areas of the diaphragms, one against the other, by vocal sound waves, a mouth piece connected to the toy, the mouth piece having a passage-way communicating with the chamber.

In witness whereof I have hereunto signed my name to this specification.

HUBERT A. MYERS.